United States Patent
Iijima et al.

(10) Patent No.: US 9,487,656 B2
(45) Date of Patent: Nov. 8, 2016

(54) HEAT CURABLE ADDITION-REACTIVE TYPE SILICONE RUBBER COMPOSITION

(71) Applicant: Momentive Performance Materials Japan LLC, Minato-ku, Tokyo (JP)

(72) Inventors: Hiroyoshi Iijima, Tokyo (JP); Hideo Takahashi, Tokyo (JP); Hidefumi Tagai, Tokyo (JP)

(73) Assignee: MOMENTIVE PERFORMANCE MATERIALS JAPAN LLC, Minato-ku, Tokyo (JP)

( * ) Notice: Subject to any disclaimer, the term of this patent is extended or adjusted under 35 U.S.C. 154(b) by 0 days.

(21) Appl. No.: 14/438,796

(22) PCT Filed: Nov. 1, 2013

(86) PCT No.: PCT/JP2013/079695
§ 371 (c)(1),
(2) Date: Apr. 27, 2015

(87) PCT Pub. No.: WO2014/069623
PCT Pub. Date: May 8, 2014

(65) Prior Publication Data
US 2015/0299398 A1 Oct. 22, 2015

(30) Foreign Application Priority Data
Nov. 5, 2012 (JP) .................. 2012-243430

(51) Int. Cl.
| | | |
|---|---|---|
| C08L 83/04 | (2006.01) |
| C08K 5/3435 | (2006.01) |
| C08K 5/3445 | (2006.01) |
| C08K 5/3447 | (2006.01) |
| C08K 5/3472 | (2006.01) |
| C08K 5/34 | (2006.01) |
| C08K 5/43 | (2006.01) |
| C08G 77/14 | (2006.01) |

(52) U.S. Cl.
CPC .............. *C08L 83/04* (2013.01); *C08G 77/14* (2013.01); *C08K 5/34* (2013.01); *C08K 5/3435* (2013.01); *C08K 5/3445* (2013.01); *C08K 5/3447* (2013.01); *C08K 5/3472* (2013.01); *C08K 5/43* (2013.01)

(58) Field of Classification Search
None
See application file for complete search history.

(56) References Cited

U.S. PATENT DOCUMENTS

| | | | | |
|---|---|---|---|---|
| 2006/0040116 A1* | 2/2006 | Ikeno | ................... | C08K 5/3412 428/447 |
| 2011/0039991 A1* | 2/2011 | Iijima | ................... | C08G 77/04 524/99 |

FOREIGN PATENT DOCUMENTS

| | | | |
|---|---|---|---|
| JP | 2011-029709 A | | 2/1999 |
| JP | 2005-220317 | * | 8/2005 |
| JP | 2009-173922 A | | 8/2009 |
| JP | 2011-021105 A | | 2/2011 |
| WO | WO 2009/084730 A1 | | 7/2009 |
| WO | WO 2009/084733 A1 | | 7/2009 |

OTHER PUBLICATIONS

Machine translation of JP 2005-220317 into English (no date).*
English-language International Search Report for PCT/JP2013/079695 (2 pages).
Translation of International Preliminary Report on Patentability issued in Application No. PCT/JP2013/079695 dated May 5, 2015 (1 page).
Translation of Written Opinion of the International Searching Authority issued in Application No. PCT/JP2013/079695 dated Nov. 26, 2013 (4 pages).

* cited by examiner

*Primary Examiner* — Marc Zimmer
(74) *Attorney, Agent, or Firm* — Flynn, Thiel, Boutell & Tanis, P.C.

(57) ABSTRACT

A heat-curable addition-reactive type silicone rubber composition which gives a molded article having excellent antistatic property, heat resistance, compression set property. The heat-curable addition-reactive type silicone rubber composition includes:
(A) a mixture containing a heat curable addition-reactive silicone rubber and a curing agent,
(B) an ionic liquid in an amount of 30 to 3000 ppm relative to 100 parts by mass of the component (A), wherein the curing agent is not included in the 100 parts by mass,
(C) a heterocyclic compound containing nitrogen atoms in an amount of 30 to 3000 ppm relative to 100 parts by mass of the component (A), wherein the curing agent is not included in the 100 parts by mass.

8 Claims, No Drawings

HEAT CURABLE ADDITION-REACTIVE TYPE SILICONE RUBBER COMPOSITION

TECHNICAL FIELD

The present invention relates to a heat-curable addition-reactive type silicone rubber composition which gives a molded article having a good antistatic property, heat resistance, and compression set property, and relates to a cured article obtained therefrom.

BACKGROUND ART

Since molded articles obtained from a heat-curable silicone rubber composition have an excellent transparency, they are suitably used for a cover of a portable music player, portable game, cellular phone, or controller of game playing device, a silicone rubber mold used for manufacturing a duplicate through the use of a urethane resin and the like, a silicone rubber coating to fabrics, or the like.

When used for the above-mentioned applications, an excellent antistatic property is required.

WO-A1 2009/084730 and WO-A1 2009/084733 disclose heat-curable silicone rubber compositions containing a silicone base polymer component and an ionic liquid, and molded articles obtained from these compositions have an antistatic property.

In JP-A 11-29709, there is described a flame retardant silicone rubber composition containing a heat-curable silicone rubber composition and a tetrazole compound including at least one functional group selected from an amino group, amide group, carbonyl group, carboxyl group and thiol group. These tetrazole compounds are used as a flame retardant.

It is described that this composition is useful for a wire coating, gasket for building, sealant, sponge sealant, roll, sponge sheet, key pat, plug boots, anode cap, sealing material for which a flame retardant property is required, and the like; various electric and electronic parts, materials for building, and the like.

SUMMARY OF THE INVENTION

When trying to further enhance the antistatic property of the composition of WO-A1 2009/084730 and WO-A1 2009/084733, the content of the ionic liquid is increased, but in such a case, there is a problem in which the heat resistance and compression set property of the molded article are lowered, and thus there is room for improvement in this respect. Particularly, when a curing system is an addition reaction one, there is a great problem to be solved in which the heat resistance and compression set property, both of which the silicone rubber inherently has are remarkably deteriorated.

The problem to be solved of the composition of the JP-A 11-29709 is to enhance the heat resistance, but an ionic liquid is not contained and there is not described a problem to be solved of improving the antistatic property.

An object of the present invention is to provide a heat-curable addition-reactive type silicone rubber composition which gives a molded article having an excellent antistatic property, heat resistance and compression set property, and to provide a cured product obtained therefrom.

The present invention can provide, as a means for solving the problem, a heat-curable addition-reactive type silicone rubber composition including:

(A) a mixture containing a heat-curable addition-reactive silicone rubber and a curing agent,
(B) an ionic liquid in an amount of 30 to 3000 ppm relative to 100 parts by mass of the component (A), wherein the curing agent is not included in the 100 parts by mass, and
(C) a heterocyclic compound containing nitrogen atoms in an amount of 30 to 3000 ppm relative to 100 parts by mass of the component (A), wherein the curing agent is not included in the 100 parts by mass.

According to the silicone rubber composition of the present invention, a molded article having high antistatic property can be obtained by containing the ionic liquid of the component (B), and furthermore, a molded article (cured product) having a high heat resistance and compression set property can be obtained without impairing the antistatic property by containing the heterocyclic compound of the component (C).

DETAILED DESCRIPTION OF THE INVENTION

Component (A)

The heat-curable addition-reactive type silicone rubber of the component (A) becomes a rubber elastic body by being cured by heating.

The component (A) is a mixture containing the polyorganosiloxane base polymer (silicone base polymer) and the curing agent, and other components as necessary.

As the silicone base polymer, there is used a polyorganosiloxane in which there are at least two vinyl groups among the organic groups that are bonded to a silicon atom in one molecule.

The organic group that bonds to a silicon atom of the silicone base polymer is a monovalent non-substituted or substituted hydrocarbon group, and there are exemplified a non-substituted hydrocarbon group of an alkyl group such as methyl, ethyl, propyl, butyl, hexyl or dodecyl; an aryl group such as phenyl; an aralkyl group such as β-phenylehtyl or β-phenylpropyl; and a substituted hydrocarbon group such as chloromethyl or 3,3,3-trifluoropropyl, and methyl is preferable.

As the curing agent, there can be used a curing catalyst and a crosslinking agent.

As the curing catalyst, there can be used a platinum-based catalyst such as platinic acid chloride, platinum olefin complex, platinum vinylsiloxane complex, platinum carbon or platinum triphenylphosphine complex.

As the crosslinking agent, there can be used a polyorganosiloxane in which the number of hydrogen atoms bonding to a silicon atom exceeds at least two on average in one molecule.

The content of the curing catalyst is preferably 1 to 1000 ppm relative to 100 parts by mass of the silicone base polymer in an amount of platinum atom.

The content of the crosslinking agent is preferably an amount such that the number of the hydrogen atoms which bond to the silicon atom in the crosslinking agent is preferably 0.5 to 4.0 relative to the alkenyl group in the silicone base polymer, more preferably 1.0 to 3.0.

There may be blended into the component (A), known additives usually used in the silicone rubber composition such as a filler, pigment, heat resistant improver, flame retardant, antioxidant, adhesion aid, and processing aid, and also other polyorganosiloxanes may be used together within the range not impairing the effects of the present invention.

Examples of such additives can include a reinforcing filler such as aerosol silica, precipitated silica or diatomaceous earth, titanium oxide, aluminum oxide, zinc oxide, iron oxide, cerium oxide, mica, clay, graphite, zinc carbonate, manganese, cerium hydroxide, glass beads, polydimethylsiloxane, alkenyl-containing polysiloxane, and the like.

Furthermore, the component (A) can also contain a well-known foaming agent in order to make the molded article obtained by the present invention into a foamed structure. Examples of the foaming agent can include an azo-based compound such as azoisobutilonitrile, 1,1'-azobis-1-acetoxy-1-phenylethane or azodicarbonamide, a nitroso compound such as dinitrilomenthamaylenetetramine or N,N-dimethyl-N,N-dinitorosoterephthalamide, and the like.

Component (B)

The component (B) is an ionic liquid containing an anionic component and a cationic component.

The preferable ionic liquid of the component (B) is a liquid at normal temperature (23° C.) (melting salt at normal temperature), and has a decomposition temperature of 220° C. or more.

Furthermore, from the viewpoint of solubility in water, the ionic liquid of the component (B) is preferably an ionic liquid having a poor water-solubility or water-insolubility with respect to the solubility in water. Note that, at normal temperature, an ionic liquid easily dissolved in water when water and the liquid are mixed in equal amounts is defined as being easily water-soluble, whereas the liquid phase separating when being allowed to stand after mixing is defined as being water-insoluble, and the liquid becoming white turbid and not dissolving is defined as being poorly water-soluble.

The ionic liquid described above includes a cation and an anion, and examples of the anion are an alkyl sulfate-based anion, a tosylate anion, a sulfonate-based anion, bis(trifluoromethanesulfonyl)imide anion, bis(fluorosulfonyl)imide anion, hexafluorophosphate anion, tetrafluoroborate anion, a halide anion, and the like.

Examples of the alkyl sulfate anion are methyl sulfate anion, ethyl sulfate anion, octyl sulfate anion, 2-(2-methoxyethoxy)ethyl sulfate, and the like. Examples of the sulfonate-based anion are methanesulfonate anion, trifluoromethanesulfonate anion, and the like. Examples of the halide anion are chloride anion, bromide anion, iodide anion, and the like.

Among them, from the viewpoint of being capable of imparting the antistatic property without impairing the excellent properties of the silicone rubber, the ionic liquid having bis(trifluoromethanesulfonyl)imide anion is most preferable.

Examples of the cation are an imidazolium-based cation, a pyrrolidinium-based cation, a pyridinium-based cation, an ammonium-based cation, a phosphonium-based cation, a sulfonium-based cation, and the like. Particularly in the present invention, preferable are the imidazolium-based cation, the pyrrolidinium-based cation, the pyridinium-based cation, the ammonium-based cation.

Furthermore, it is possible to use the ionic liquid having at least one alkenyl group as the cation component. The component (B) including such a cation component is particularly preferable because of being able to stay for a long time within the silicone rubber composition.

Here, examples of the alkenyl group are an aliphatic unsaturated hydrocarbon group such as vinyl, allyl, methylvinyl, propenyl, butenyl, pentenyl or hexenyl; a cyclic unsaturated hydrocarbon group such as cyclopropenyl, cyclobutenyl, cyclopentenyl or cyclohexenyl; methacryl group, and the like. Among them, a vinyl group or allyl group is preferable.

Examples of the pyrrolidinium-based cation are 1-butyl-methylpyrrolidinium cation, 1-methyl-propylpyrrolidinium cation and the like. Examples of the pyridinium-based cation are 3-methyl-1-propylpyridinium cation, N-butyl-3-methylpyridinium cation, 1-methyl-1-propylpyridinium cation and the like. Examples of the ammonium-based cation are diallyldimethylammonium cation, methyltrioctylammonium cation and the like. Examples of the imidazolium-based cation are 1-butyl-3-methylimidazolium cation, 1,2-dimethyl-3-propylimidazolium cation, 1-ethyl-3-methylimidazolium cation, 1-vinylimidazolium cation, 1-allylimidazolium cation, 1-allyl-3-methylimidazolium cation and the like.

Moreover, examples of the ionic liquid including the bis(trifluoromethanesulfonyl)imide anion and the pyrrolidinium-based cation are 1-butyl-1-methylpyrrolidinium.bis(trifluoromethanesulfonyl)imide, 1-methyl-1-propylpyrrolidinium.bis(trifluoromethanesulfonyl)imide; examples of the ionic liquid including the bis(trifluoromethanesulfonyl)imide anion and the pyridinium-based cation are 3-methyl-1-propylpyridinium.bis(trifluoromethanesulfonyl)imide, N-butyl-3-methylpyridinium.bis(trifluoromethanesulfonyl)imide, 1-methyl-1propylpyridinium.bis(trifluoromethanesulfonyl)imide; Examples of the ionic liquid including the bis(trifluoromethanesulfonyl)imide anion and the ammonium-based cation are diallyldimethylammonium.bis(trifluoromethanesulfonyl)imide, methyltrioctylammonium.bis(trifluoromethanesulfonyl)imide; examples of the imidazolium-based cation are 1-butyl-3-methylimidazolium.bis(trifluoromethanesulfonyl)imide, 1,2-dimethyl-3-propylimidazolium.bis(trifluoromethanesulfonyl)imide, 1-ethyl-3-methylimidazolium.bis(trifluoromethanesulfonyl)imide, 1-vinylimidazolium.bis(trifluoromethanesulfonyl)imide, 1-allylimidazolium.bis(trifluoromethanesulfonyl)imide, 1-allyl-3-methylimidazolium.bis(trifluoromethanesulfonyl)imide, and the like.

The ionic liquid used in the present invention is not limited to the ionic liquids exemplified above.

The content (on a mass basis) of the component (B) is 30 to 3000 ppm relative to 100 parts by mass of the mixture of the component (A) (however, the curing agent is not included in the 100 parts by mass) preferably 40 to 1000 ppm, and more preferably 50 to 500 ppm.

Furthermore, the content (on a mass basis) of the component (B) is 10,000 ppm or less relative to 100 parts by mass of the mixture of the component (A) (however, the curing agent is not included in the 100 parts by mass), preferably 5,000 ppm or less, and more preferably 100 to 500 ppm.

When the content of the component (B) is less than 30 ppm, the antistatic property is not enough, and even when blending larger than 3000 ppm, not only is the effect saturated but also commercial disadvantages are caused.

Component (C)

The heterocyclic compound containing nitrogen atoms of the component (C) can enhance the antistatic property by increasing the content of the component (B), and even in that case, is a component which acts so as to maintain, at a high level, the heat resistance and compression set property.

The heterocyclic compound containing nitrogen atoms of the component (C) is a cyclic compound which is constituted of two or more elements, and forms a three-membered to ten-membered ring, and may be a saturated compound or an unsaturated compound.

In order to solve the problem by the present invention, the heterocyclic compound containing nitrogen atoms of the component (C) is preferably one which does not contain at least one functional group selected from an amino group, amide group, carbonyl group, carboxyl group and thiol group.

Examples of the heterocyclic compound containing nitrogen atoms of the component (C) can include triazole, tetrazole, imidazole, pyrazole, oxazole, tiazole, imidazoline, pyrazine, morpholine, tiazine, indole, isoindole, benzoimidazole, prine, quinolone, isoquinoline, quinoxaline, cinnoline, pteridine, and the like.

Among them, a triazole compound, a tetrazole compound, an imidazole compound, a pyrazole compound, and a benzoimidazole compound are preferable, and a triazole compound and a tetrazole compound are more preferable.

The content (on a mass basis) of the component (C) is 30 to 3000 ppm relative to 100 parts by mass of the mixture of the component (A) (however, the curing agent is not included in the 100 parts by mass) preferably 40 to 1000 ppm, and more preferably 50 to 500 ppm.

When the content of the component (C) is less than 30 ppm, the effects of preventing the degradation of the heat resistance and the compression set property is not enough, and even when blending larger than 3000 ppm, not only is the effect saturated but also commercial disadvantages are caused.

Note that, since many of the component (C) are solid at normal temperature, although it is possible to add them by dissolving them in a solvent, a mixture obtained by previously mixing them in a solid state with a dispersing medium such as the silicone base polymer of the component (A) or the polyorganosiloxanes, and by dispersing them mechanically by using a three-roll mill or the like can be used as the component (C).

Here, in the case where the mixture containing the silicone base polymer of the component (A) is used as the dispersing medium for the component (C), although the silicone base polymer also acts as the component (A), the amount of the silicone base polymer to be used as the dispersing medium contained in the above-mentioned mixture is small and the amount of the component (C) itself relative to the component (A) is very small, and thus the amount of the silicone base polymer to be used as the dispersing medium is substantially a negligible amount in consideration of the amount of the silicone base polymer of the component (A).

The composition of the present invention can be manufactured by mixing the component (A), the component (B), and the component (C).

According to the composition of the present invention, in order to mix the component (A) and the component (B) more uniformly, and stably maintain the antistatic property for a long time, it is preferable to employ a method in which mixing of the ionic substance of the component (B) with the filler containing the reinforcing silica is performed to carry the ionic substance on the filler, and then mixing with the component (A) is performed.

The molded article obtained from the heat-curable silicone rubber composition of the present invention not only keeps the excellent antistatic property, but also is excellent in transparency, thermal stability, compression set property and the like, all of which the silicone rubber inherently has.

Accordingly, the molded article is suitably used for: a cover of a portable music player, portable game, cellular phone, controller of a game playing device or the like; a silicone rubber mold used for manufacturing a duplicate with urethane resin and the like; and silicone rubber coating on fabrics.

EXAMPLE

The following Examples describing the working of the present invention are explained. The Examples describe exemplifications of the present invention, and the present invention is not limited thereby.

Hereinafter, "part" means "part by mass", and ppm means a mass basis.

EXAMPLE AND COMPARATIVE EXAMPLE

Component (A)

[(A)-1]

There were mixed 38 parts of a fumed silica having a specific surface area of 300 m$^2$/g, 8.0 parts of hexamethyldisilazane as a surface-treating agent for the fumed silica, and 0.50 part of divinylmethylsilazane, into 100 pars of dimethylpolysiloxane blocked at both ends with dimethylvinylsiloxy groups and having a viscosity of 60,000 cSt (polymerization degree 930) for one hour at room temperature, which was then heated and mixed at 150° C. for one hour.

After that, the resultant mixture was mixed in a dissolver for 1.5 hours with heating under a reduced pressure, and then cooled to room temperature to thereby give a base compound.

Furthermore, mixing was carried out by adding 1.3 parts of dimethylsiloxane.methylvinylsiloxane copolymer formed of 86.2% by mole of $(CH_3)_2SiO$ unit, 13.8% by mole of $(CH_2=CH)SiO$ unit and blocked at both ends with dimethylvinylsiloxy groups, 20 ppm as platinum atom of a platinum-octanol complex solution (platinum content 4.0%) as a platinum catalyst, 0.01 part of 1-ethynyl-1-cyclohexanol as a curing inhibitor.

After that, mixing was finally carried out by adding 8.5 parts of dimethylsiloxane.methylhydrogensiloxane copolymer formed of 50% by mole of $(CH_3)_3SiH_{1/2}$ unit, 50% by mole of $SiO_2$ unit and blocked at both ends with trimethylsiloxy groups to thereby give a liquid silicone rubber base mixture serving as the component (A)-1.

[(A)-2]

45 Parts of a dry silica (manufactured by NIPPON AEROSIL) having a specific surface area of 150 m$^2$/g and 6 parts of polydimethylsiloxane having silanol at the end (average polymerization degree 10) were mixed into 100 parts of a polyorganosiloxane having a polymerization degree of 5000, formed of 99.88% by mole of $(CH_3)_2SiO$ unit and 0.12% by mole of $(CH_3)(CH_2=CH)SiO$ unit and blocked at the end with a dimethylvinylsilyl group, and were mixed with heating at 150° C. for 2 hours to thereby give a base compound. After that, blending of 0.5 part of an addition-type curing agent TC-25A (curing catalyst) and 2.0 parts of TC-25B (crosslinking agent) (manufactured by MOMENTIVE PERFORMANCE MATERIALS JAPAN) were carried out to thereby give a silicone rubber base mixture serving as the component (A)-2.

<Component (C)>

The heterocyclic compound as the component (C) shown in Table 1 was mixed with the dimethylpolysiloxane serving as the dispersing medium, blocked at both ends with dimethylvinylsiloxy groups having a viscosity of 60,000 cSt so that the content ratio of the heterocyclic compound (content in the sum of the dimethylpolysiloxane and the heterocyclic compound) was 20% by mass. Furthermore, the resultant mixture was dispersed by being passed through a three-roll mill twice to thereby give the component (C).

The amount of the component (C) shown in Table 1 is only an amount of the component (C), obtained by removing the amount of the dimethylpolysiloxane as the dispersing medium.

Example 1 to 9

The components (A) to (C) shown in Table 1 were mixed. The mixture was press-cured at 130° C. for 10 minutes to thereby give a rubber test piece for evaluating its properties.

Comparative Example 1 to 5

Each component was mixed as shown in Table 1. The mixture was press-cured at 130° C. for 10 minutes to thereby give a rubber test piece for evaluating its properties.

The results in which the properties of the rubber test piece obtained were evaluated by the following standards are shown in Table 1.

Appearance

Evaluated with the naked eye.

Charged Voltage Half-Life

After a test piece was charged by 6 KV corona discharge, the time (seconds) when a charged voltage is reduced by half was measured through the use of a Static Honestmeter H-0110 manufactured by Shishido Electrostatic, Ltd.

Measurement of Rubber Properties

After producing a sheet, hardness was measured in accordance with JIS K 6249.

Heat Resistance Test

After performing vulcanization in an air-circulation oven at 200° C. for 4 hours, the change in hardness was observed. The symbol + shows the increase of hardness, and for example, "1" in Example 1 shows an increase of hardness by 1. Namely, a large change in hardness was not observed.

The symbol − shows the decrease in hardness, and for example, "−15" in Comparative Example 2 shows a decrease of hardness by 15. Namely, there was a large change in hardness, and the inherent hardness was not maintained.

Compression Set Property

A test piece was produced in accordance with JIS K 6249, and a test was carried out under the conditions at 25% compression, 180° C.×22 hours.

TABLE 1

| | | EXAMPLE | | | | | | | | |
|---|---|---|---|---|---|---|---|---|---|---|
| | | 1 | 2 | 3 | 4 | 5 | 6 | 7 | 8 | 9 |
| (A) | (A)-1 | 100 | 100 | 100 | 100 | | | | | |
| | (A)-2 | | | | | 100 | 100 | 100 | 100 | 100 |
| (B) | 1-Butyl-3-methylpyrrolidinium-bis(trifluoromethanesulfonyl)imide (ppm) | 300 | 300 | | | 300 | | | | |
| | 1-Ethyl-3-methylimidazolium-bis(fluorosulfonyl)imide (ppm) | | | 300 | | | | | | |
| | 1-Butyl-3-methylpyridinium-bis(trifluoromethanesulfonyl)imide (ppm) | | | | 300 | | | | | |
| | 1-Methyl-1-propylpyrrolidinium-bis(trifluoromethanesulfonyl)imide 50 ppm | | | | | | 50 | | | |
| | 1-Methyl-1-propylpyridinium-bis(trifluoromethanesulfonyl)imide 50 ppm | | | | | | | 70 | | |
| | Methyltrioctylammonium-bis(trifluoromethanesulfonyl)imide 50 ppm | | | | | | | | 40 | 1000 |
| (C) | 1,2,4-Triazole (ppm) | 300 | | | | | 50 | | | 1000 |
| | Benzotriazole (ppm) | | 300 | | | 600 | | 100 | | |
| | 5,5'-bi-1H-tetrazole-2 ammonium (ppm) | | | 300 | | | | | 70 | |
| | 5,5'-bi-1H-tetrazole-piperazine (ppm) | | | | 300 | | | | | |
| Measured Items | Appearance | White translucent | White translucent | White translucent | White translucent | White translucent | Translucent | Translucent | Translucent | Translucent |
| | Withstand Voltage Half-Life (sec) | 0.2 | 0.1 | 0.2 | 0.1 | 0.1 | 2 | 2 | 2 | 0.1 |
| | Hardness (type A) | 43 | 43 | 46 | 46 | 49 | 50 | 51 | 50 | 47 |
| | Heat resistance Change of hardness (200° C. × 4 hours after) | 2 | 2 | 4 | 4 | 2 | 4 | 5 | 5 | 5 |
| | Compression set (%, 25% compression, 180° C × 22 hours) | 23 | 25 | 46 | 48 | 30 | 32 | 35 | 33 | 39 |

| | | COMPARATIVE EXAMPLE | | | | |
|---|---|---|---|---|---|---|
| | | 1 | 2 | 3 | 4 | 5 |
| (A) | (A)-1 | 100 | 100 | 100 | 100 | 100 |
| | (A)-2 | | | | | |
| (B) | 1-Butyl-3-methylpyrrolidinium•bis(trifluoromethanesulfonyl)imide (ppm) | 5 | 300 | | | |
| | 1-Ethyl-3-methylimidazolium•bis(fluorosulfonyl)imide (ppm) | | | | | |
| | 1-Butyl-3-methylpyridinium•bis(trifluoromethanesulfonyl)imide (ppm) | | | | | |

-continued

|  |  | COMPARATIVE EXAMPLE | | | | |
|---|---|---|---|---|---|---|
|  |  | 1 | 2 | 3 | 4 | 5 |
| (C) | 1-Methyl-1-propylpyrrolidinium•bis(trifluoromethanesulfonyl)imide 50 ppm | | | | | |
|  | 1-Methyl-1-propylpyridinium•bis(trifluoromethanesulfonyl)imide 50 ppm | | | | | |
|  | Methyltrioctylammonium•bis(trifluoromethanesulfonyl)imide 50 ppm | | | | | |
|  | 1,2,4-Triazole (ppm) | | | 300 | | |
|  | Benzotriazole (ppm) | | | | | |
|  | 5,5'-bi-1H-tetrazole•2 ammonium (ppm) | | | | 300 | |
|  | 5,5'-bi-1H-tetrazole•piperazine (ppm) | | | | | |
| Measured Items | Appearance | White translucent | White translucent | White translucent | White translucent | White translucent |
|  | Withstand Voltage Half-Life (sec) | 16 | 0.3 | Not attenuated | Not attenuated | Not attenuated |
|  | Hardness (type A) | 45 | 45 | 46 | 46 | 52 |
|  | Heat resistance Change of hardness (200° C. × 4 hours after) | 4 | −16 | 2 | 4 | 5 |
|  | Compression set (%, 25% compression, 180° C. × 22 hours) | 49 | 104 | 25 | 46 | 47 |

As is clear from a comparison between the Example and Comparative Example, the composition of the present invention exhibits a high antistatic property and also excellent heat resistance and compression set property by using the component (B) and the component (C) together and by increasing the content of the component (B).

The heat-curable addition-reactive type silicone rubber composition can be used to manufacture raw materials for: a cover of a portable music player, portable game, cellular phone, controller of game playing device and the like; a silicone rubber mold used for manufacturing a duplicate with a urethane resin and the like; and a silicone rubber coating on fabrics.

The invention claimed is:

1. A heat curable addition-reactive type silicone rubber composition comprising:
    (A) a mixture containing a heat curable addition-reactive silicone rubber and a curing agent,
    (B) an ionic liquid in an amount of 40 to 1000 ppm relative to 100 parts by mass of the component (A), wherein the curing agent is not included in the 100 parts by mass,
    (C) a heterocyclic compound containing nitrogen atoms in an amount of 30 to 3000 ppm relative to 100 parts by mass of the component (A) and comprising at least one compound selected from the group consisting of a triazole compound, a tetrazole compound, an imidazole compound, a pyrazole compound and a benzoimidazole compound, wherein the curing agent is not included in the 100 parts by mass.

2. The heat-curable addition-reactive type silicone rubber composition according to claim 1, wherein the heterocyclic compound containing nitrogen atoms of the component (C) is one not containing at least one kind of functional group selected from an amino group, an amide group, a carbonyl group, a carboxyl group and a thiol group.

3. The heat-curable addition-reactive type silicone rubber composition according to claim 1, wherein the heterocyclic compound containing nitrogen atoms of the component (C) is at least one of a triazole compound and a tetrazole compound.

4. The heat-curable addition-reactive type silicone rubber composition according to claim 1, wherein an anion of the component (B) is a bis(trifluoromethanesulfonyl)imide anion.

5. The heat-curable addition-reactive type silicone rubber composition according to claim 1, wherein a cation of the component (B) is at least one of an imidazolium-based cation, a pyrrolidinium-based cation, a pyridinium-based cation, and an ammonium-based cation.

6. The heat-curable addition-reactive type silicone rubber composition according to claim 1, wherein the component (B) is 1-butyl-1-methylpyrrolidinium.bis(trifluoromethanesulfonyl)imide, 1-methyl-1-propylpyrrolidinium.bis(trifluoromethanesulfonyl)imide, 3-methyl-1-propylpyridinium.bis(trifluoromethanesulfonyl)imide, N-butyl-3-methylpyridinium.bis(trifluoromethanesulfonyl)imide, 1-methyl-1-propylpyridinium.bis(trifluoromethanesulfonyl)imide, diallyldimethylammonium.bis(trifluoromethanesulfonyl)imide, methyltrioctylammonium.bis(trifluoromethanesulfonyl)imide, 1-butyl-3-methylimidazolium.bis(trifluoromethanesulfonyl)imide, 1,2-dimethyl-3-propylimidazolium.bis(trifluoromethanesulfonyl)imide, 1-ethyl-3-methylimidazolium.bis(trifluoromethanesulfonyl)imide, 1-vinylimidazolium.bis(trifluoromethanesulfonyl)imide, 1-allylimidazolium.bis(trifluoromethanesulfonyl)imide, 1-allyl-3-methylimidazolium.bis(trifluoromethanesulfonyl)imide.

7. The heat-curable addition-reactive type silicone rubber composition according to claim 1, wherein a content of the component (B) is 50 to 500 ppm, and a content of the component (C) is 50 to 500 ppm.

8. An antistatic silicone rubber cured product obtained by curing the silicone rubber composition according to claim 1.

* * * * *